E. M. Ivens,
Windlass.
N° 17,065.
Patented Apr. 14, 1857.
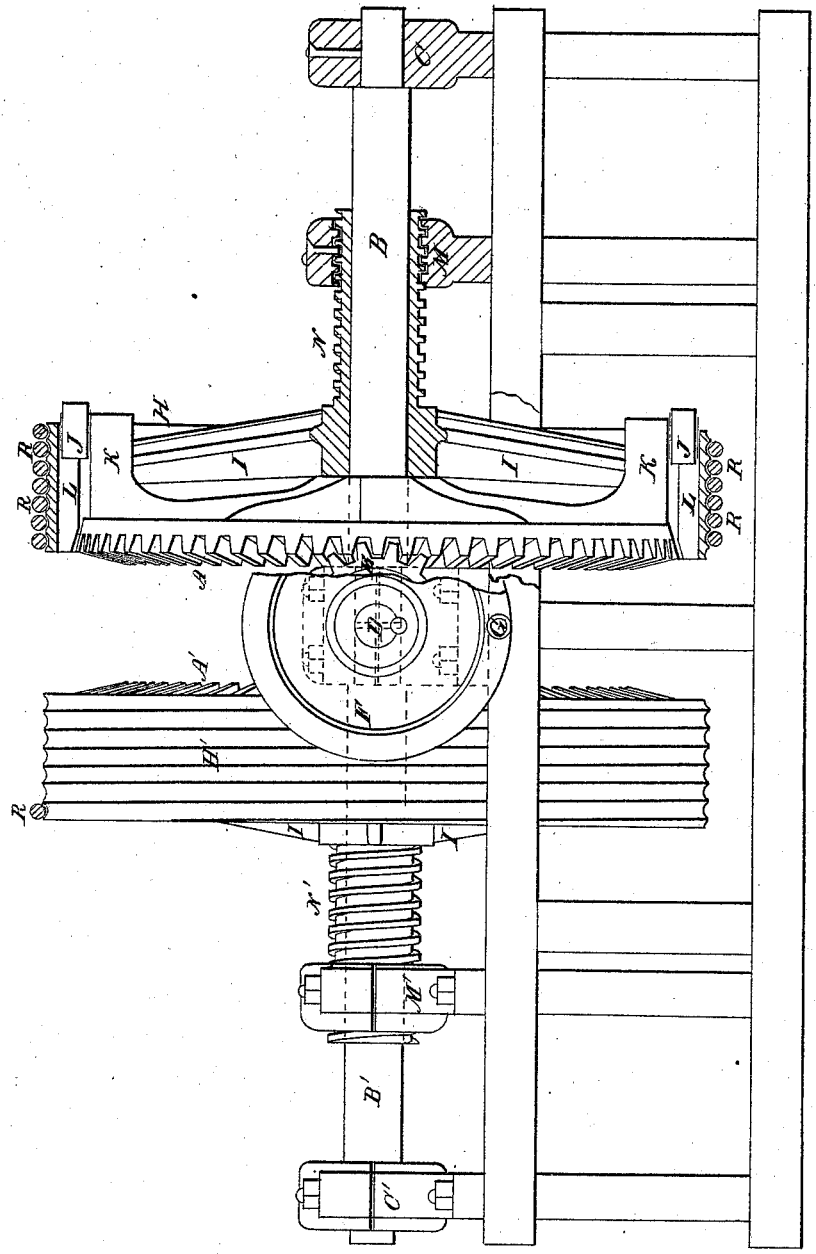

UNITED STATES PATENT OFFICE.

EDMUND M. IVENS, OF TAMAQUA, PENNSYLVANIA, ASSIGNOR TO E. M. IVENS AND L. H. ALLEN, OF TAMAQUA, PENNSYLVANIA.

WINDING MACHINERY FOR MINES.

Specification of Letters Patent No. 17,065, dated April 14, 1857.

*To all whom it may concern:*

Be it known that I, EDMUND M. IVENS, of Tamaqua, in Schuykill county and State of Pennsylvania, have invented a new and useful Improvement in Winding Machinery for Mines and other Like Purposes, of which the following is a full, clear, and exact description, reference being had to the accompanying drawing, through letters of reference marked thereon, forming part of this specification, and which represents a front view of my machinery, part in elevation and part in section.

In fitting up machinery for working coal or other mines, it is very desirable to adapt it to the use of wire rope instead of chain, as, for a mine of the average depth, (365 feet in the Schuylkill district), the chain costs sixteen hundred dollars ($1600), while the same quantity of rope capable of sustaining the same weight, costs only four hundred and fifty ($450) ; and owing to the liability of there being defective links in a chain, either from bad iron or imperfect welding, it is much more liable to part than the rope.

In the ordinary winding machinery, the drums are so arranged and operated, as that they require carrying pulleys for the ropes or chains to pass over, to bring them in a direct line with the shaft or incline, which necessarily causes considerable friction upon the ropes, and wears them out very rapidly.

To remedy this evil constitutes the main feature of my invention, which consists in so arranging and operating the winding machinery, as that drums of any desired size may be used, and the ropes pass directly from the upperside of each, down the shaft, at all times parallel and equidistant without using carrying pulleys, whereby the wire rope at about one-fourth of the cost of chain, is rendered equally, if not more durable than the latter, and the machinery being divested of parts, the operation of which produced a large amount of friction is worked at much less cost.

To enable others to make and use my invention, I will describe its construction and operation.

(A, A',) represent a pair of bevel wheels, hung face to face and concentric on two cylindrical shafts (B, B',), which are supported and revolve in journal boxes (C, C',) at their extreme ends, and in a similar one at their inner ends, which is represented in dotted lines; between the bevel wheels (A, A,') and transversely to their axis is a shaft (D), with a bevel pinion (E) keyed firmly thereon, gearing into each; on the outer end of this shaft is a flange (F) or crank, with a wrist pin (G), to which is attached the two pitmen of a double cylinder steam engine, the cylinders of which are arranged at an angle of about 45 degrees, one on each side; (H, H',) are two cast iron drums of equal size, the arms (I) of which are placed sufficiently to one side to allow their peripheries to extend over even with the face of the bevel wheels, when their hubs come in contact with those of the wheels; these drums are cast with long hubs (N, N',) extending outward, which are bored to fit the cylindrical shafts (B, B',) on which they are supported; the outer periphery of these hubs is chased with a screw, the pitch of which is a trifle more than the diameter of the rope intended to be used; the periphery of the drums is also chased with a curved channel spirally around them, for the rope (R) to wind in, the pitch of which is equal to that of the screw on the hub; these drums are rotated with the bevel wheels, by two or more antifriction rollers (J), which are supported on brackets or arms (K), extending rearward from the bevel wheels, each roller traversing between two ribs (L) on the inner periphery of the drum, so that when the bevel wheels are rotated in either direction, the rollers, coming in contact with the ribs (L), cause the drums to rotate with them, while the screwed hubs, revolving in the stationary female screws or pedestals (M), cause them to slide on their axes, back and forth, according to the direction in which they are rotated, by which means the direction of the ropes down the incline or shaft, in winding or unwinding is never changed, so that there is no inclination in them to ride one turn upon another, or in the car to run sidewise in the shaft, or off the track in the incline; and by arranging the drums side by side and operating them by bevel gearing, as before described, they are rotated in the opposite directions to each other, so that while the rope is winding up on one of them, that on the other is unwinding, while their sliding motion insures that the point on each drum from which the rope leaves its periphery can never vary in its relative position to the shaft or incline; the ropes both branching off on the same side, and over the top of each, at equal distance from the shaft, will always maintain a parallel direction down the shaft or incline, without the necessity of carrying pulleys to guide them; and in driving the drums from their periphery, all strain is taken off the shaft, as well as off their hubs and arms, they merely serving as guides, so that the machinery may be constructed much lighter than if they were driven by square shafts, or feathered ones as heretofore.

I am aware that rotating drums have been made to travel laterally by means of a screw around their axes; this therefore I do not claim, but What I do claim as new and desire to secure by Letters Patent is—

The arrangement of the traveling drums on concentric axes when operated in the manner and for the purposes substantially as described. I also claim rotating the traveling drums by means of the rollers (J) and ribs or guides (L) arranged at or near their inner periphery, or in any equivalent manner whereby their hubs and axes are used merely as guides as set forth.

In testimony whereof, I hereunto subscribe my name, this 14th day of November 1856.

EDMUND M. IVENS.

Witnesses:
 JOHN S. HOLLINGSHEAD,
 WM. M. SMITH.